US008985799B2

(12) United States Patent
Shimizu et al.

(10) Patent No.: US 8,985,799 B2
(45) Date of Patent: Mar. 24, 2015

(54) LIGHTING DEVICE, DISPLAY DEVICE AND TELEVISION DEVICE

(75) Inventors: Takaharu Shimizu, Osaka (JP); Kaori Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 89 days.

(21) Appl. No.: 13/883,051

(22) PCT Filed: Nov. 24, 2011

(86) PCT No.: PCT/JP2011/077013
§ 371 (c)(1),
(2), (4) Date: May 2, 2013

(87) PCT Pub. No.: WO2012/073778
PCT Pub. Date: Jun. 7, 2012

(65) Prior Publication Data
US 2013/0222705 A1    Aug. 29, 2013

(30) Foreign Application Priority Data

Nov. 30, 2010 (JP) ................................. 2010-267041

(51) Int. Cl.
*F21V 7/00* (2006.01)
*G02F 1/1335* (2006.01)
(52) U.S. Cl.
CPC ............. *F21V 7/00* (2013.01); *G02F 1/133603* (2013.01); *G02F 1/133605* (2013.01)
USPC ...................................................... 362/97.2
(58) Field of Classification Search
CPC ................... G02F 1/133603; G02F 1/133605; F21V 7/00
USPC ............... 362/240, 241, 331, 97.1, 97.3, 282, 362/235, 249.01, 290, 561, 617; 349/64, 349/67, 102, 83
See application file for complete search history.

(56) References Cited

U.S. PATENT DOCUMENTS

| 4,271,408 | A | * | 6/1981 | Teshima et al. ................. 345/83 |
| 4,345,308 | A | * | 8/1982 | Mouyard et al. .............. 362/332 |
| 6,871,982 | B2 | * | 3/2005 | Holman et al. ............... 362/331 |
| 7,455,429 | B2 | * | 11/2008 | Barker .......................... 362/290 |

(Continued)

FOREIGN PATENT DOCUMENTS

JP    2008-292991 A    12/2008

OTHER PUBLICATIONS

Official Communication issued in International Patent Application No. PCT/JP2011/077013, mailed on Feb. 28, 2012.

*Primary Examiner* — Thomas A Hollweg
(74) *Attorney, Agent, or Firm* — Keating & Bennett, LLP (57) ABSTRACT

An object is to prevent or reduce uneven brightness in a direct-type lighting device. A lighting device according to the present technology includes LEDs 28 arranged in a matrix on a bottom plate of the chassis and a reflector 26 including first and second side walls 26a, 26b each arranged between the LEDs 28 adjacent in a Y-axis direction and an X-axis direction, respectively. The LEDs 28 are configured to emit light toward an opening of the chassis. The first side wall 26a has a side surface 26a rising from a front surface 30a of an LED board 30 toward the opening of the chassis while being inclined. The first side wall 26a extends straightly along the X-axis direction and has a triangular cross-sectional shape taken along the Y-axis direction. The second side wall 26b has a prism-like shape rising from the front surface 30a toward the opening and has a rhombic outline in a plan view.

19 Claims, 9 Drawing Sheets

(56) References Cited

U.S. PATENT DOCUMENTS

| | | | |
|---|---|---|---|
| 7,520,642 B2* | 4/2009 | Holman et al. | 362/328 |
| 7,530,711 B2* | 5/2009 | Bang | 362/241 |
| 8,059,230 B2* | 11/2011 | Yeh | 349/67 |
| 2005/0138852 A1* | 6/2005 | Yamauchi | 40/582 |
| 2005/0185419 A1* | 8/2005 | Holman et al. | 362/561 |
| 2007/0035968 A1* | 2/2007 | Nakano | 362/612 |
| 2007/0052663 A1* | 3/2007 | Kim et al. | 345/102 |
| 2007/0070625 A1* | 3/2007 | Bang | 362/240 |
| 2007/0109779 A1* | 5/2007 | Sekiguchi et al. | 362/249 |
| 2008/0211989 A1* | 9/2008 | Park | 349/64 |
| 2008/0297907 A1 | 12/2008 | Howe et al. | |
| 2009/0086508 A1* | 4/2009 | Bierhuizen | 362/617 |
| 2009/0268430 A1* | 10/2009 | Suzuki et al. | 362/97.1 |
| 2009/0273735 A1* | 11/2009 | Yeh | 349/67 |
| 2010/0033956 A1* | 2/2010 | Kirchberger et al. | 362/97.1 |
| 2010/0061087 A1* | 3/2010 | Stevens et al. | 362/97.3 |
| 2010/0067224 A1* | 3/2010 | Wu | 362/235 |
| 2010/0165472 A1* | 7/2010 | Hamasaki et al. | 359/627 |
| 2010/0166407 A1* | 7/2010 | Iwanaga et al. | 396/176 |
| 2010/0284190 A1* | 11/2010 | Oide et al. | 362/282 |
| 2011/0063850 A1* | 3/2011 | Oide et al. | 362/296.01 |
| 2011/0241056 A1* | 10/2011 | David et al. | 257/98 |
| 2011/0292655 A1* | 12/2011 | Ing et al. | 362/241 |

* cited by examiner

LIGHTING DEVICE, DISPLAY DEVICE AND TELEVISION DEVICE

TECHNICAL FIELD

The present invention relates to a lighting device, a display device, and a television device.

BACKGROUND ART

In recent years, a display element of an image display device such as a television device is shifting from a conventional CRT display device to a thin display device using a thin display element such as a liquid crystal panel and a plasma display panel. This enables the image display device to have a reduced thickness. A liquid crystal panel used for a liquid crystal display device does not emit light, and thus a backlight unit is required as a separate lighting device.

As the backlight unit, a direct-type backlight unit that supplies light directly to a liquid crystal panel from its rear side is known. In such a backlight unit, a reflector may be provided on a mounting surface on which light sources such as LEDs are mounted.

Patent Document 1 discloses a reflector to be used in a direct-type backlight unit, for example. The reflector has a three-dimensional shape including inclined surfaces inclined from a mounting surface of LEDs toward a liquid crystal panel. The reflector includes a plurality of equal through holes through which the respective LEDs as the light sources are passed and side walls equally surrounding each of the LEDs passed through the through holes. If such a reflector is used in the direct-type backlight unit, light emitted from the LEDs can be evenly led toward the liquid crystal panel side by the inclined surfaces of the reflector, and thus a display surface of the liquid crystal panel can have an even brightness distribution.

RELATED ART DOCUMENT

Patent Document

Patent Document 1: Japanese Unexamined Patent Publication No. 2008-292991

Problem to be Solved by the Invention

However, if a thickness of the direct-type backlight unit including the reflector described in Patent Document 1 is reduced, the LEDs are located nearer to the display surface. This increases brightness of the display panel at sections corresponding to the LEDs. On the contrary, this decreases brightness of the display panel at sections corresponding to areas between the LEDs adjacent to each other in a vertical direction, a horizontal direction, and a diagonal direction in a plan view. This may lead uneven brightness on the display surface of the liquid crystal panel.

DISCLOSURE OF THE PRESENT INVENTION

The present invention was made in view of the above circumstances. It is an object of the present invention to provide a technology that can prevent or reduce the uneven brightness that may be caused on the display surface in the direct-type lighting device including the reflector configured to direct the light toward the display surface.

Means for Solving the Problem

A technology disclosed herein relates to a lighting device including a chassis including a bottom plate having a first main surface, a side plate rising from an outer periphery of the first main surface, a plurality of light sources arranged in a matrix on the first main surface side of the bottom plate, and a reflector including a first side wall and second side walls. The chassis has an opening on a first main surface side. The light sources are configured to emit light toward the opening of the chassis. The first side wall is arranged between the light sources adjacent to each other in a first direction that is one of a vertical direction and a horizontal direction in a plan view. The first side wall has a side surface rising from a mounting surface on which the light sources are mounted toward the opening of the chassis while being inclined. The first side wall extends straightly along the second direction that is another one of the vertical direction and the horizontal direction and has a triangular cross section taken along the first direction. The second side walls are each arranged between the light sources adjacent to each other in the second direction. The second side walls each have a prism-like shape rising from the mounting surface toward the opening of the chassis and each have a rhombic outline in a plan view.

According to the above lighting device, the light emitted from the light source is divided into three groups of light, i.e., light directly traveled toward the opening of the chassis (the display side), light traveled toward the first side wall, and light traveled toward the second wall. The light traveled to the first wall is reflected by the side surface of the first side wall and directed toward the opening of the chassis. The light traveled to the second wall is reflected by the side surface of the second wall. The second side wall has an outline that is substantially rhombus in a plan view, and thus the light emitted from the light source and reflected by a side surface of the second side wall is directed toward the first side wall. Accordingly, the light can be effectively directed to a section of the display surface that overlaps with an area between the adjacent light sources. This prevents or reduces the brightness unevenness on the display surface.

The side surface of the first side wall may extend straightly in a cross section taken along the first direction. The side surface forms an acute angle with the mounting surface on which the light sources are mounted. The acute angle may satisfy an expression: $10° \leq \theta1 \leq 80°$ where $\theta1$ is the acute angle formed between the side surface of the first side wall and the mounting surface.

If the angle $\theta1$ is smaller than $10°$ or larger than $80°$, the light traveled toward the first side wall is less reflected toward the opening of the chassis. With the above-described configuration, the amount of light traveled to the first side wall and reflected toward the opening of the chassis can be increased. This further prevents or reduces the brightness unevenness of the display surface.

The side surface of the first side wall may satisfy an expression: $\theta1 = 45° + \tan^{-1}(H1/L1)/2$ where $L1$ is a distance between one of the light sources and an apex of the first side wall, and $H1$ is a distance between the mounting surface on which the light sources are mounted and the apex of the first side wall.

With this configuration, the light traveled to the first side wall can be effectively reflected toward the opening of the chassis. This prevents or reduces the brightness unevenness of the display surface.

The side surface of the first side wall may be rounded to have a concave surface curved toward an inner side of the first side wall in a cross section taken along the first direction.

With this configuration, the light can be more effectively focused on the section of the display surface that overlaps with the area between the light sources adjacent to each other. This further prevents or reduces the brightness unevenness on the display surface.

Each of the second side walls has a side surface that forms an acute angle with the mounting surface on which the light sources are mounted. The acute angle may satisfy an expression: $45° \leq θ2 \leq 90°$ where $θ2$ is the acute angle formed between the side surface of the second side wall and the mounting surface.

If the angle $θ2$ is smaller than 45° or larger than 90°, the light traveled toward the second side wall is less effectively reflected toward the first side wall. With the above-described configuration, the light traveled to the second side wall can be effectively directed to the first side wall. This prevents or reduces the brightness unevenness on the display surface.

The second side walls each having the rhombic outline in a plan view may include four corners that are rounded.

In the production of the second side wall, the corners of the second side wall tend to be rounded. The above-described configuration facilitates the production of the second wall.

The first side wall may include a plurality of first side walls. Each of the second side walls may extend from one of the first side walls to another one of the first side walls adjacent to each other in the first direction.

With this configuration, most of the light traveled from the light source to the second side wall can be directed to the first side wall. Accordingly, the light can be more effectively directed to the section of the display surface that overlaps with the area between the adjacent light sources.

Each of the second side walls may include two corners each located adjacent to each of the first side walls and connected to the first side wall.

In the production of the second side wall, the two corners located adjacent to the first side wall tend to be continuous with the first side wall. The above-described configuration can facilitate the production of the second side wall.

Each of the second side walls may have a top surface. The top surface may be arranged parallel with the bottom plate of the chassis.

With this configuration, the light traveled away from the opening of the chassis to the second side wall can be reflected again by the top surface toward the opening of the chassis.

The reflector may further include a bottom having a plurality of through holes through each of which each of the light sources are passed. The bottom may be arranged on the mounting surface of the light sources without overlapping with the first side wall and the second side wall.

With this configuration, the light traveled away to the mounting surface side of the light sources can be reflected toward one of the opening of the chassis, the first side wall, and the second side wall. This further increases the brightness of the display surface.

A distance between the light sources adjacent to each other in the first direction may be larger than a distance between the light sources adjacent to each other in the second direction.

According to the configuration, the first side wall configured to direct the light toward the opening of the chassis is arranged between the light sources largely spaced apart from each other. With this configuration, the first side walls and the second side walls can more effectively direct the light to the section of the display surface that overlaps with the area between the light sources adjacent to each other.

The first side wall may include a plurality of first side walls. Distances between the first side walls adjacent to each other may gradually decrease toward a middle section of the chassis and distances between the light sources adjacent to each other in the first direction may gradually decrease toward the center of the chassis.

With this configuration, the amount of light reflected by the first side walls at a middle section of the chassis can be increased. This increases the brightness of the display surface of the liquid crystal panel at the middle section.

Distances between the second side walls may gradually decrease toward a middle section of the chassis and distances between the light sources adjacent to each other in the second direction may gradually decrease toward the middle section of the chassis.

With this configuration, the amount of light reflected by the second side walls at the middle section of the chassis can be increased. This increases the brightness of the display surface of the liquid crystal panel at the middle section.

The lighting device may further include an optical member over the opening of the chassis. The light from the light sources passes through the optical member. The optical member and an apex of the first side wall may not be in contact with each other, thereby providing a space therebetween.

With this configuration, the light directed toward the opening of the chassis can be effectively scattered. This increases the brightness of the display surface.

The first side wall and the second side walls may be equal in height.

With this configuration, most of the light traveled to the second side wall can be directed to the first side wall that is adjacent to the second side wall. Accordingly, the light can be more effectively directed to the section of the display surface that overlaps with the area between the adjacent light sources.

Each of the light sources may have a light intensity distribution in which light having a peak light intensity travels in a direction inclined with respect to a front direction of each of the light sources.

With this configuration, the light can be emitted from the light source at a wide angle, and thus the amount of light that is emitted from the light source and applied to the side surface of the first side wall can be increased. This increases the brightness of the display surface.

An angle formed between the side surface of the first side wall and the front direction of the light source may be smaller than an angle formed between light having a peak light intensity and the front direction of the light source.

In this configuration, the light emitted from the light source with a peak light intensity is applied to the inclined surface of the reflector. Accordingly, the amount of light directed from the light sources to the front direction of the light source can be increased. This further increases the brightness of the display surface.

The first side wall and the second side walls may define spaces equal in size. Each of the light sources may be arranged in each of the spaces.

In this configuration, the spaces defined by the first side wall and the second side walls are equal in size. This facilitates the production of the reflector.

The technology disclosed herein may be embodied as a display device including a display panel configured to provide display using light from the above lighting device. Further, a display device including a liquid crystal panel using liquid crystals as the display panel has novelty and utility. Furthermore, a television device including the above display device has novelty and utility. The above display device and television can have an increased display area.

Advantageous Effect of the Invention

According to the technology disclosed herein, in the direct-type lighting device including the reflector configured to direct the light toward the display surface, the uneven brightness that may be caused on the display surface by the support member can be prevented or reduced.

MODE FOR CARRYING OUT THE INVENTION

First Embodiment

A first embodiment of the present invention will be described with reference to the drawings. An X-axis, a Y-axis, and a Z-axis are described in some drawings. Directions indicated by the axes in each drawing correspond to directions indicated by the respective axes in other drawings. The Y-axis direction corresponds to a vertical direction and the X-axis direction corresponds to a horizontal direction.

Figure 1:
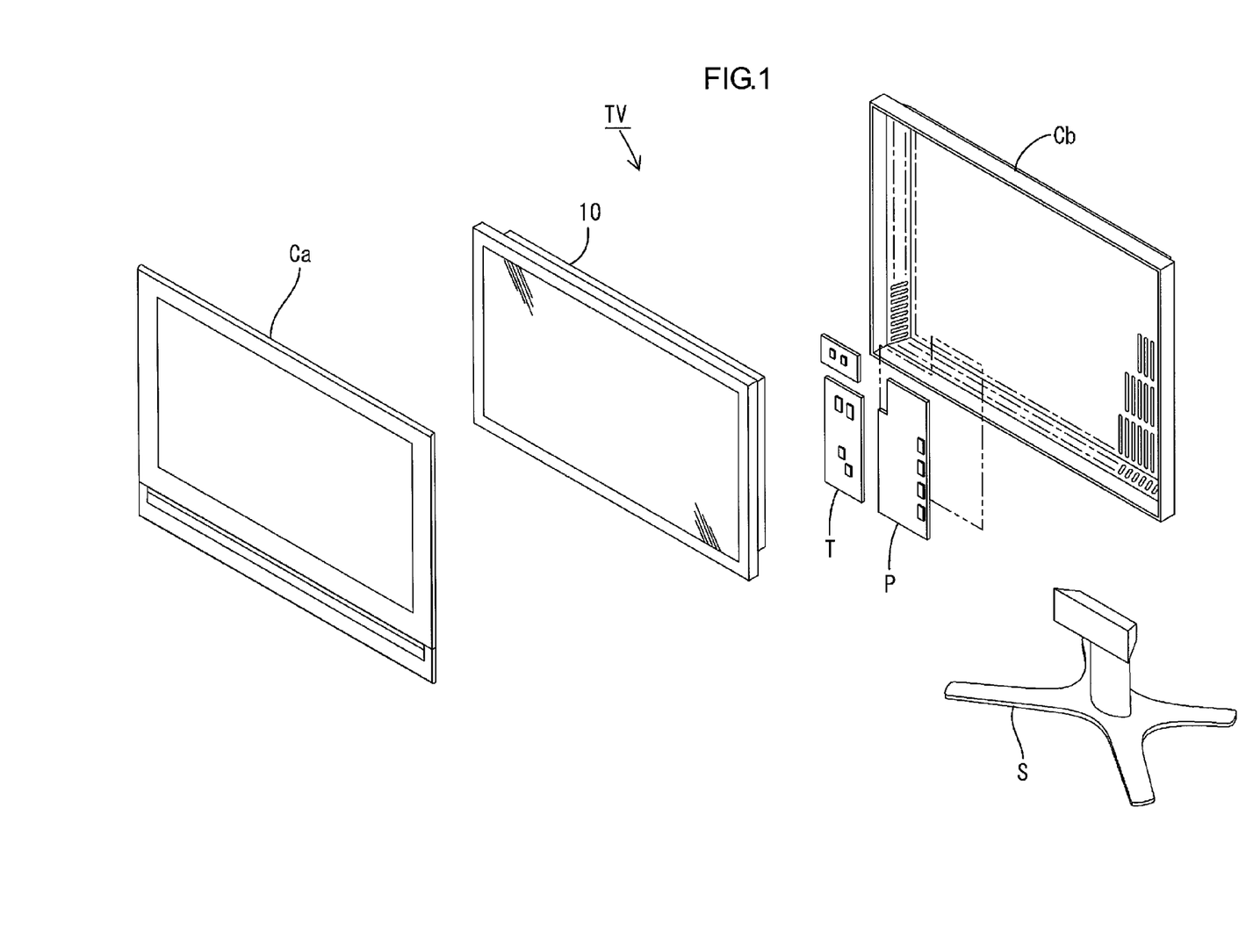
FIG. 1 is an exploded perspective view of a television device TV according to a first embodiment.

FIG. 1 illustrates a television device TV according to the first embodiment in an exploded perspective view. The television device TV includes a liquid crystal display device 10, front and back cabinets Ca and Cb, a power supply P, a tuner T, and a stand S. The front and back cabinets Ca and Cb sandwich, and thus house, the liquid crystal display device 10. The liquid crystal display device 10 has a landscape quadrangular shape as a whole and held in the vertical position.

Figure 2:
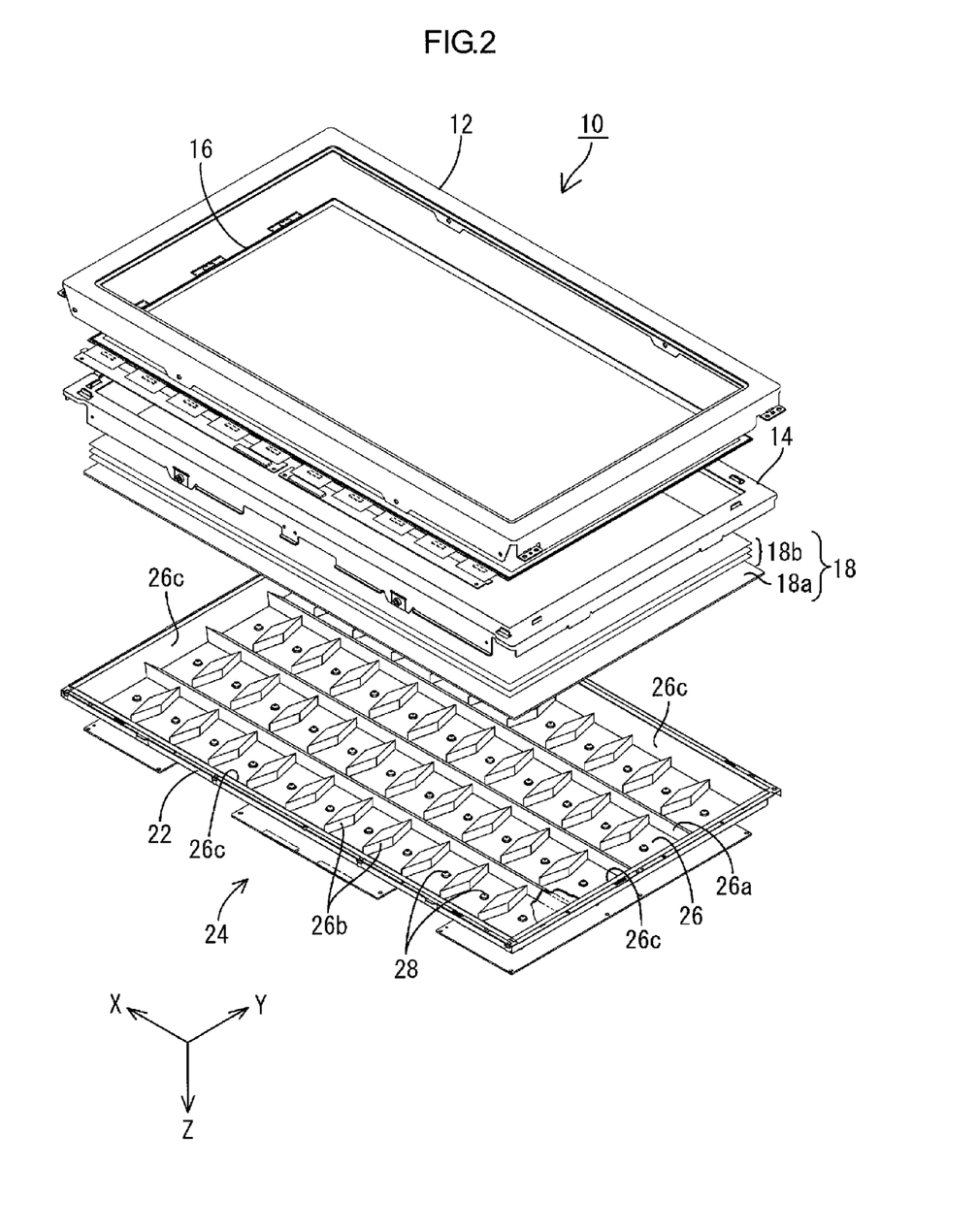
FIG. 2 is an exploded perspective view of a liquid crystal display device 10.

FIG. 2 illustrates the liquid crystal display device 10 in an exploded perspective view. Herein, an upper side and a lower side in FIG. 2 correspond to a front side and a rear side, respectively. As illustrated in FIG. 2, the liquid crystal display device 10 includes a liquid crystal panel 16 as a display panel and a backlight unit 24 as an external light source. The liquid crystal panel 16 and the backlight unit 24 are integrally held by a frame-shaped bezel 12 and the like.

Next, the liquid crystal panel 16 will be described. The liquid crystal panel 16 is configured such that a pair of transparent (high light transmissive) glass substrates is bonded together with a predetermined gap therebetween and a liquid crystal layer (not illustrated) is sealed between the glass substrates. On one of the glass substrates, switching components (for example, TFTs) connected to source lines and gate lines which are perpendicular to each other, pixel electrodes connected to the switching components, an alignment film, and the like are provided. On the other glass substrate, color filters having color sections such as red (R), green (G), and blue (B) color sections arranged in a predetermined pattern, counter electrodes, an alignment film, and the like are provided. Image data and control signals that are necessary to display an image are sent from a drive circuit board, which is not illustrated, to the source lines, the gate lines, and the counter electrodes. Polarizing plates (not illustrated) are arranged on outer surfaces of the glass substrates.

Figure 3:
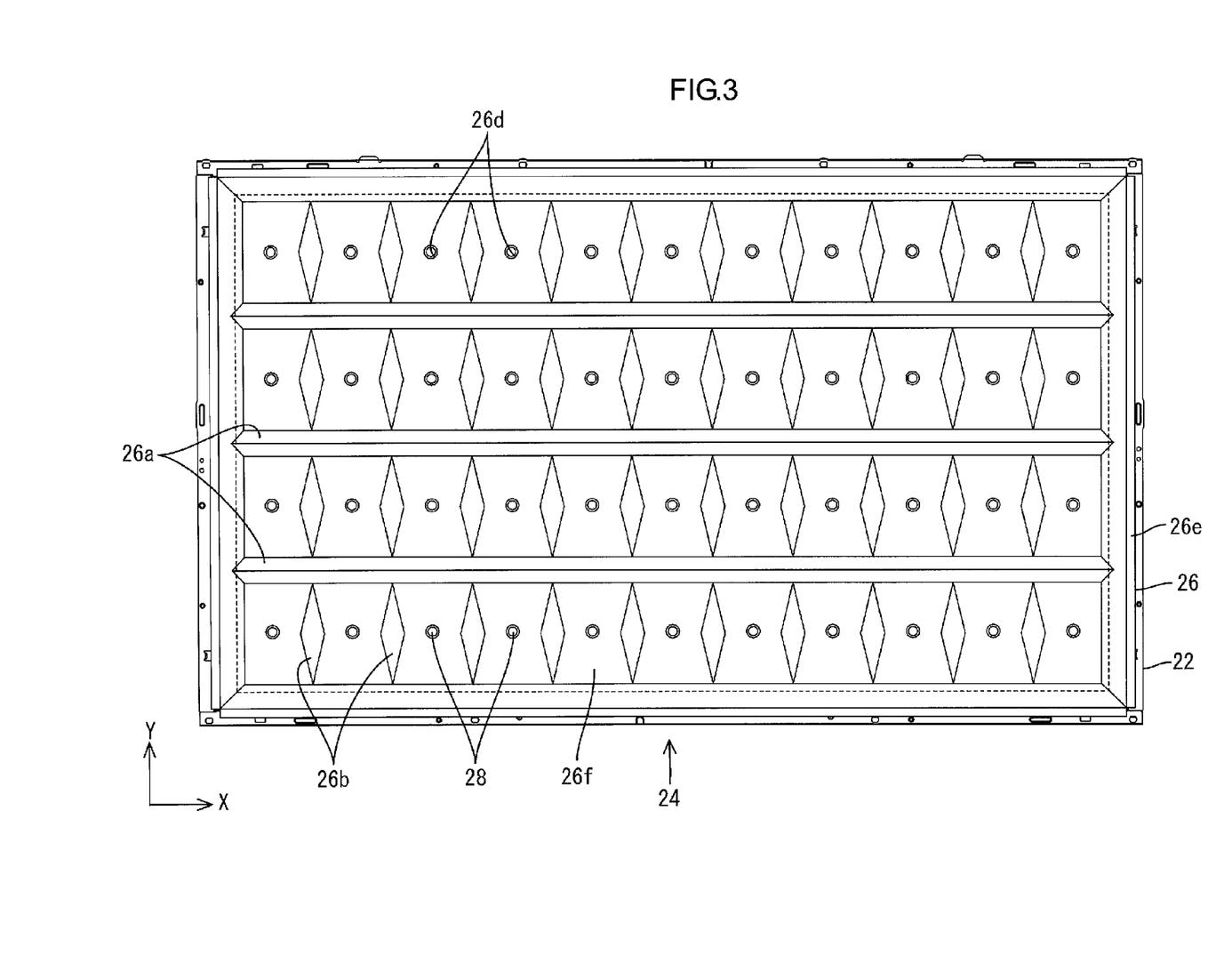
FIG. 3 is a plan view of a backlight unit 24.
Figure 4:
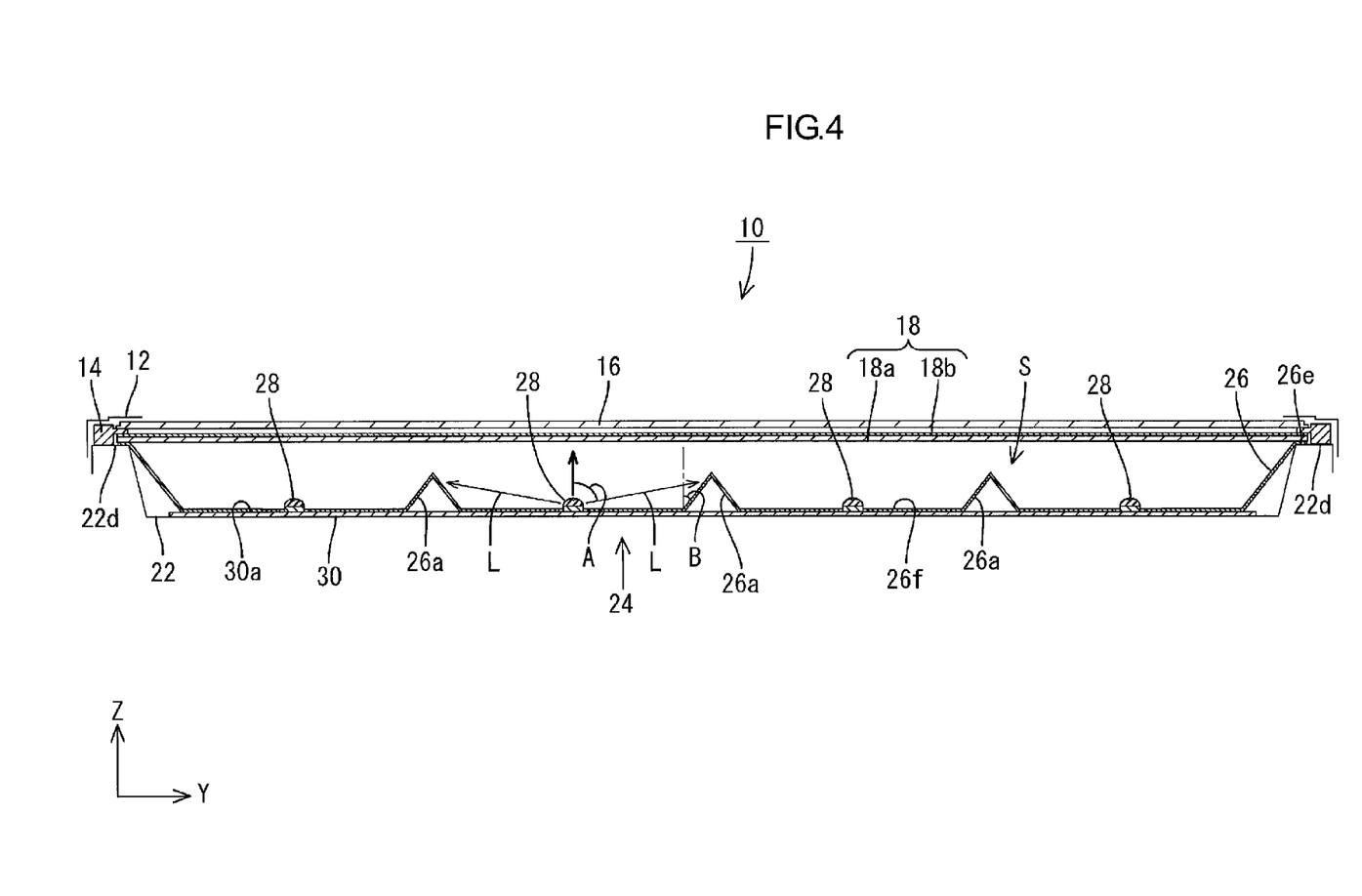
FIG. 4 is a cross-sectional view of the backlight unit 24.
Figure 5:
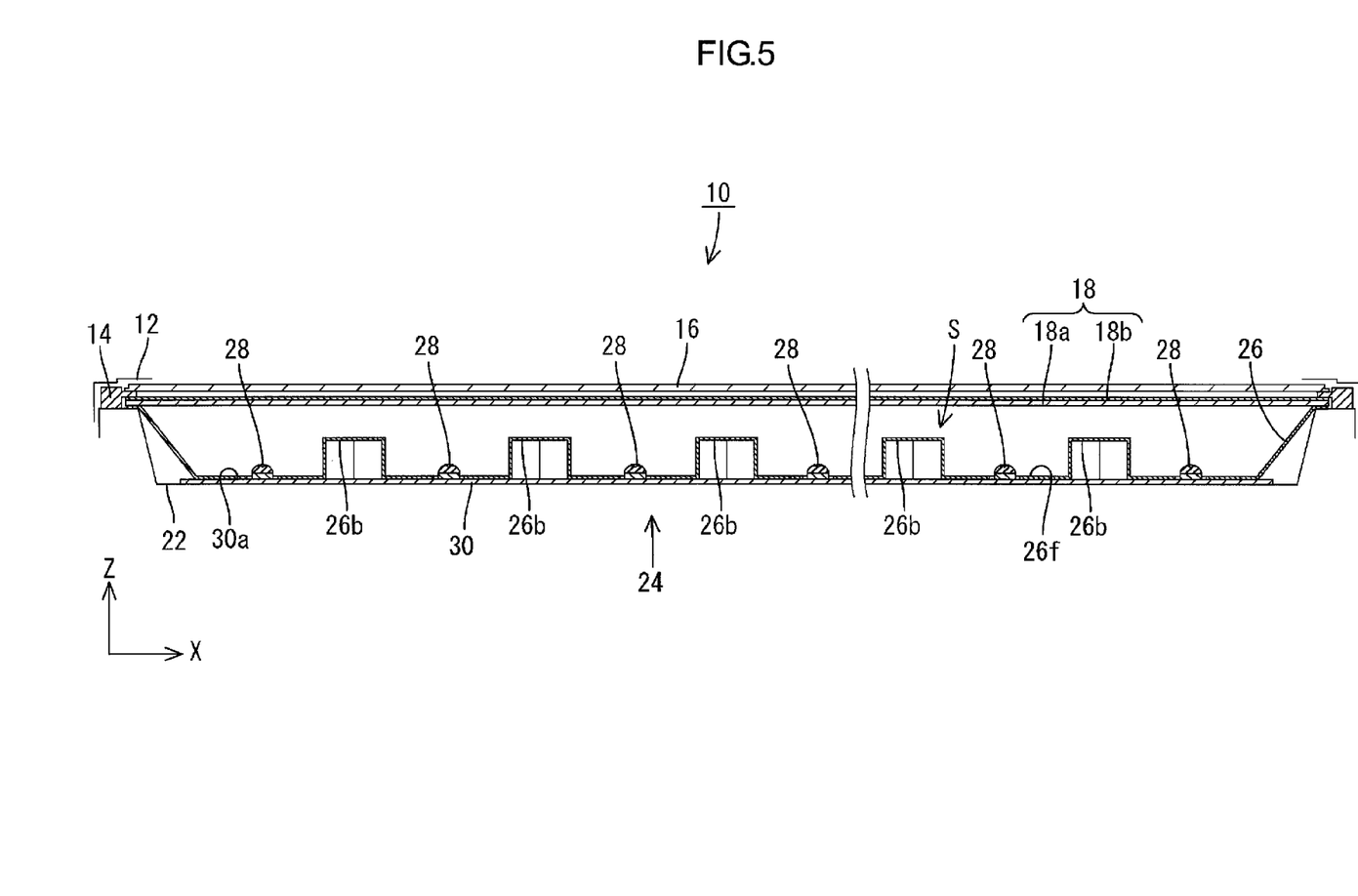
FIG. 5 is a cross-sectional view of the backlight unit 24.

Next, the backlight unit 24 will be described. FIG. 3 illustrates the backlight unit 24 in a plan view. FIG. 4 illustrates the backlight unit 24 in a cross-sectional view taken along a line passing through the LED light sources 28 in the vertical direction (Y-axis direction). FIG. 5 illustrates the backlight unit 24 in a cross-sectional view taken along a line passing through the LED light sources 28 in the horizontal direction (the X-axis direction). As illustrated in FIG. 2, the backlight unit 24 includes a chassis 22, an optical member 18, and a frame 14. The chassis 22 has a box-like shape with an opening on the front side (a light exit side, the liquid crystal panel 16 side). The optical member 18 is provided on the front side of the chassis 22 so as to cover the opening thereof. The frame 14 has a frame-like shape and supports the liquid crystal panel 16 along its inner edge.

The chassis 22 houses an LED board 30 and a reflector 26. A plurality of point-like LED (Light Emitting Diode) light sources 28 are arranged on the LED board 30 (see FIG. 4 and FIG. 5). As illustrated in FIG. 3, the LED light sources 28 are arranged in a matrix in a plan view. That is, the LED light sources 28 are arranged in rows and columns. In the backlight unit 24, the side closer to the optical member 18 than the LED board 30 side is a light exit side. Namely, the backlight unit 24 is a direct-type backlight unit in which light is directly applied to the liquid crystal panel 16 from its rear side through the optical member 18.

The chassis 22 is made of metal such as aluminum. The chassis 22 includes a bottom plate 22a, side plates 22b and receiving plates 22d. The entire shape of the chassis 22 is a shallow box-like shape (a shallow tray-like shape). The bottom plate 22a has a landscape rectangular shape like the liquid crystal panel 16. The bottom plate 22a is arranged on the rear side of the LED board 30, i.e., on the side opposite to the light exit side of the LED light sources 28. The side plates 22c each rise from an outer edge on each side of the bottom plate 22a. The receiving plates 22d each protrude outwardly from a tip end portion of each side plate 22c. The optical member 18 and the frame 14 can be placed on a front surface of the receiving plates 22d. The frame 14 is fixed to the receiving plates 22d with screws. The long-side direction of the chassis 22 matches the X-axis direction (the horizontal direction) and the short-side direction thereof matches the Y-axis direction (the vertical direction).

Then, the LED board 30 and the LED light sources 28 arranged on a front surface 30a of the LED board 30 will be described. As illustrated in FIG. 4 and FIG. 5, the LED board 30 has a landscape rectangular plate-like shape like the bottom plate 22a of the chassis 22. The LED board 30 is arranged on a front side of the bottom plate 22a of the chassis 22 such that the long-side direction of the LED board 30 matches the X-axis direction and the short-side direction thereof matches the Y-axis direction. The LED board 30 has a size that can cover substantially the entire area of the front surface 22z of the bottom plate 22a, specifically, most middle area other than outer peripheral portion of the front surface 22z of the bottom plate 22a.

The LED light sources 28 are mounted on the front surface 30a of the LED board 30. As illustrated in FIG. 3, the LED light sources 28 are arranged in a matrix on the LED board 30 along the X-axis direction and the Y-axis direction. The LED light sources 28 are arranged along the X-axis direction at regular intervals and arranged along the Y-axis direction at regular intervals. The intervals between the LED light sources 28 in the Y-axis direction are larger than the intervals between the LED light sources 28 in the X-axis direction. The LED light sources 28 are mutually connected by a wiring pattern on the LED board 30. The wiring pattern is not illustrated. To the LED light sources 28, driving power is supplied by a power circuit board attached on a rear side of the bottom plate 22a of the chassis 22. The circuit board is not illustrated.

The LED light sources 28 are configured to emit white light. The LED light sources 28 each may be configured by mounting a red LED chip, a green LED chip, and a blue LED chip (not illustrated) on its surface. Alternatively, the LED light sources 28 each may include a blue light emitting diode covered with a phosphor having a light emitting peak in a yellow range to emit white light. Alternatively, the LED light sources 28 each may include a blue light emitting diode covered with phosphors having a light emitting peak in a green range and in a red range to emit white light. Alternatively, the LED light sources 28 each may include a blue light emitting diode covered with a phosphor having a light emitting peak in a green range and a red light emitting diode. Alternatively, the LED light sources 28 each may include a blue light emitting diode, a green light emitting diode, and a red light emitting diode to emit white light. Alternatively, the LED light sources 28 each may include an ultraviolet light emitting diode and phosphors. Particularly, the LED light sources 28 may include an ultraviolet light emitting diode covered with phosphors each having a light emitting peak in a blue range, a green range, and a red range to emit white light.

Next, a light intensity distribution of the LED light source 28 is described. The symbol L in FIG. 4 indicates a direction of the light that is emitted from the LED light source 28 with a peak light intensity. The LED light source 28 has the light intensity distribution in which the light having a peak light intensity travels in a direction inclined with respect to the front direction of the LED light source 28. A specific unit of the light intensity may be expressed by radiant intensity (W/sr·m2), radiant flux (W), and irradiance (W/m2), for example. Other physical quantity used to express the amount of radiation may be employed.

As illustrated in FIG. 4, the light having a peak light intensity is emitted from the center of the LED light source 28 in a radial direction and travels in a direction L that forms a predetermined angle A with the front direction of the LED light source 28. Accordingly, the light is emitted from the LED light source 28 over a wide area. A side surface 26a1 of a first side wall 26a of the reflector 26, which will be described later, forms a predetermined angle B with the front direction of the LED light source 28. In the backlight unit 24, the angle A is larger than the angle B. Accordingly, the light emitted from the LED light source 28 with a peak light intensity is applied to the side surface 26a1 of the first side wall 26a of the reflector 26. Most of the light traveled from the LED light source 28 to the first side wall 26a is directed to the front direction of the LED light source 28.

Figure 6:
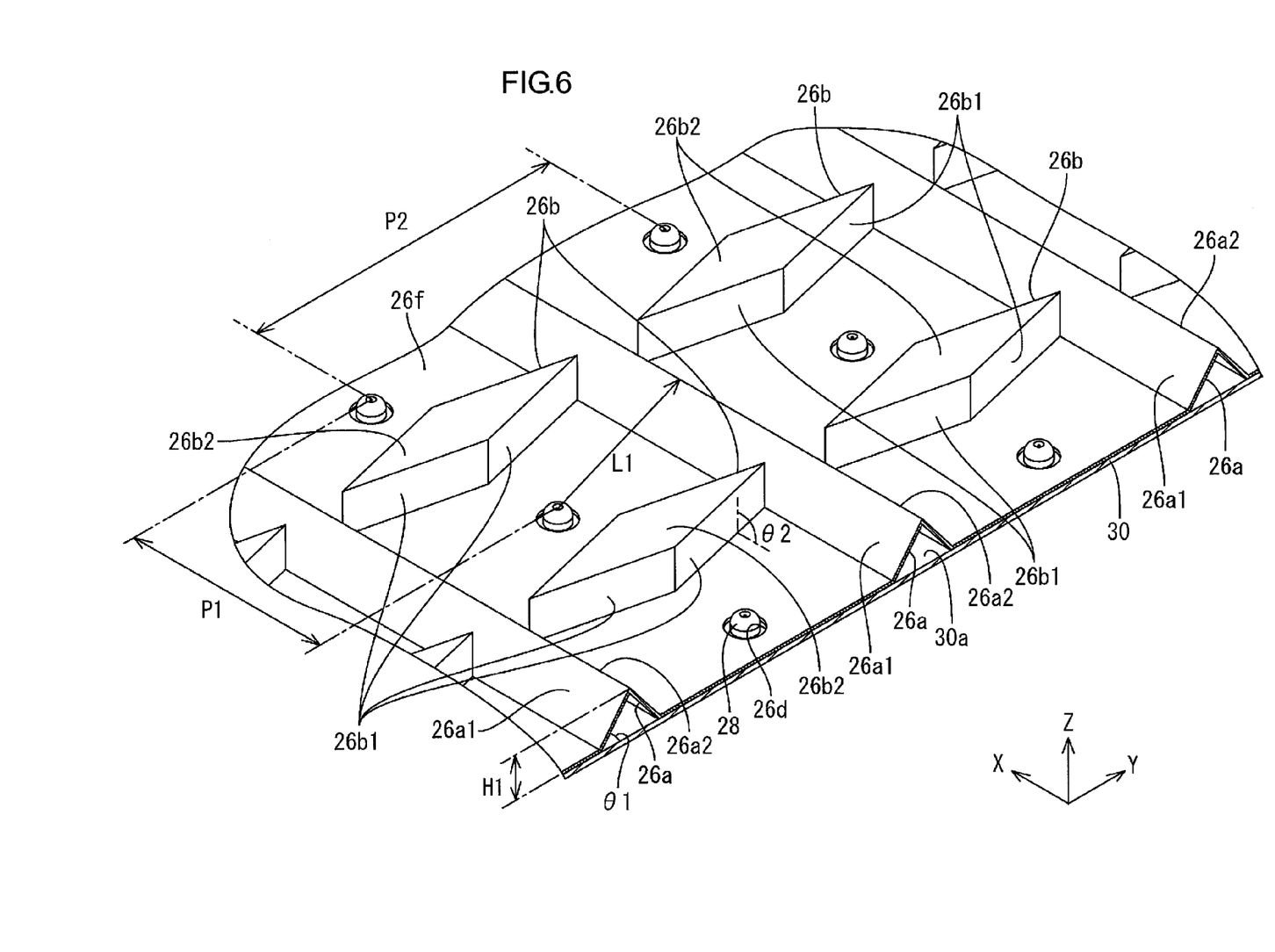
FIG. 6 is a magnified perspective view of LED light sources 28 and a part of a reflector 26.

Next, the reflector 26 will be described. FIG. 6 is a magnified perspective view of the LED light sources 28 and a part of the reflector 26. The reflector 26 is made of a thermoplastic synthetic resin. The reflector 26 has a white surface that provides high light reflectivity. The reflector 26 is arranged on a front side of the LED board 30 that is arranged on a front side of the bottom plate 22a of the chassis 22. The reflector 26 has a size enough to cover substantially the entire area of the LED board 30. The reflector 26 extends along the LED board 30. As illustrated in FIG. 2 and FIG. 3, the reflector 26 includes first side walls 26a, second side walls 26b, a bottom 26f, four rising portions 26c, and four extended portions 26e.

As illustrated in FIG. 6, each of the first side walls 26a is arranged between the LED light sources 28 adjacent to each other in the Y-axis direction. The first side walls 26a each include two side surface 26a1 diagonally extending in the Y-axis direction toward the opening of the chassis 22 (the liquid crystal panel 16 side, the upper side in FIG. 3) from the front surface 30a of the LED board 30. The first side wall 26a extends straightly along the X-axis direction. Accordingly, as illustrated in FIG. 6, the first side wall 26a has a triangular cross section taken along the Y-axis direction. An apex 26a2 of the triangle is located at the side closer to the opening of the chassis 22. In this configuration, the side surfaces 26a1 of the first side wall 26a are inclined toward the opening of the chassis 22, and thus the light travelled to the side surface 26a1 of the first side wall 26a is directed to the opening of the chassis 22, i.e., to the liquid crystal panel 16 side. The side surface 26a1 of the first side wall 26a of this embodiment has a straightly inclined cross section taken along the Y-axis direction.

As illustrated in FIG. 6, the second side walls 26b are each arranged between the LED light sources 28 adjacent to each other in the X-axis direction. The second side walls 26b each have a prism-like shape that rises from the front surface 30a of the LED board 30 toward the opening of the chassis 22. The second side walls 26b extends from one of the first side walls 26a to another one of the first side walls 26a adjacent to each other. As illustrated in FIG. 3, the overall shape of the second side wall 26b is a rhombus in a plan view, in which an outline of the second side wall 26b includes diagonal lines. The second side wall 26b includes four side surfaces 26b1 facing the LED light sources 28 and the side surfaces 26a1 of the first side walls 26a. Accordingly, the light traveled to the side surface 26b1 of the second side wall 26b is directed to the side surface 26a1 of the first side wall 26a. In this embodiment, the side surfaces 26b1 of the second side wall 26b extend perpendicular to the front surface 30 of the LED board 30 (an angle θ2 between each of the side surfaces 26b1 of the second side wall 26b and the front surface 30 of the LED board 30 is 90°). Further, the second side wall 26b has a top surface 26b2 that is parallel with the bottom plate 22a of the chassis 22 at an upper side thereof. The height from the front surface 30a of the LED board 30 to the top surface 26b2 (the height of the second side wall 26b) is equal to the height H1 of the first side wall 26a. The second wall 26b may include only four side surfaces 26b1 so as to have an opening at the opening side of the chassis 22.

The bottom 26f is arranged on the front surface of the LED board 30 except for the areas in which the first side walls 26a and the second side walls 26b are arranged. The bottom 26f is supported by the LED board 30. In other words, the first side walls 26a and the second side walls 26b are formed by portions of the bottom 26f that are raised toward the opening of the chassis 22. As illustrated in FIG. 4 and FIG. 5, the rising portions 26c each rise from an outer periphery of the bottom 26f of the reflector 26 while being inclined with respect to the bottom plate 22a of the chassis 22. As illustrated in FIG. 4 and FIG. 5, the extended portions 26e each extend outwardly from an outer edge of each of the rising portions 26c and are placed on the receiving plates 22d of the chassis 22. Further, the bottom 26f of the reflector 26 includes a plurality of through holes 26d at positions overlapping with the LED light sources 28 in a plan view. The LED light sources 28 are each passed through the respective through holes 26d. The through holes 26d are arranged along the X-axis direction and the Y-axis direction so as to correspond to the arrangement of the LED light sources 28. The LED light sources 28 passed through the through holes 26d are exposed to the front side and each surrounded by the first side wall 26a and the second side wall 26b.

Each of the side surfaces 26a1 of the first side wall 26a forms an acute angle with the front surface 30a of the LED board 30. The acute angle θ1 satisfies the relational expression: 10°≤θ1≤80°. If the angle θ1 is smaller than 10° or larger than 80°, the light traveled toward the side surface 26a1 of the first side wall 26a is less reflected toward the opening of the chassis 22. The first side wall 26a arranged to have the angle θ1 that satisfies the above-described relational expression can effectively reflect the light traveled to the side surface 26a1 of the first side wall 26a toward the opening of the chassis 22.

The angle θ1 further satisfies the relational expression: θ1=45°+tan$^{-1}$(H1/L1)/2 where L1 is a distance between the LED light source 28 and the apex 26a2 of the first side wall 26a and H1 is a distance between the front surface 30a of the LED board 30 and the apex 26a2 of the first side wall 26a (the height of the first side wall 26a). The angle θ1 set as above enables the light traveled to the side surface 26a1 of the first side wall 26a to be effectively reflected toward the opening of the chassis 22.

The first side wall 26a has such a height as to form a predetermined space S between the apex 26a2 thereof and the optical member 18. The apex 26a2 of the first side wall 26a is not in contact with the optical member 18. The space S allows the light emitted from the adjacent LED light sources 28 each of which is surrounded by the first side walls 26a and the second side walls 26b to mutually pass therethrough.

Each of the side surfaces 26b1 of the second side wall 26b forms an acute angle θ2 with the front surface 30a of the LED board 30. The acute angle θ2 satisfies the relational expression: 45°≤θ2≤90°. If the angle θ2 is smaller than 45° or larger than 90°, the light traveled toward the side surface of the second side wall is less effectively reflected toward the side surface 26a1 of the first side wall 26a (in the Y-axis direction in FIG. 6). The second side wall 26b arranged to have the angle θ2 that satisfies the above-described relational expression can effectively reflect the light traveled to the side surface 26b1 of the second wall 26b toward the side surface 26a of the first side wall 26a.

Next, the optical member 18 arranged over the opening of the chassis 22 will be described. The optical member 18 is placed on the receiving plates 22d of the chassis 22 with the extended portion 26e of the reflector 16 interposed therebetween. The optical member 18 is arranged to be parallel with the LED board 30 and covers the opening of the chassis 22. A diffuser 18a included in the optical member 18 includes a plate made of a synthetic resin and light-scattering particles dispersed therein. The diffuser 18a is configured to scatter point lights emitted from the LED light sources 28 as the point light sources and reflect the light emitted from the LED light source 28. An optical sheet 18b arranged on a front side of the diffuser 18a includes a diffuser sheet, a lens sheet, and a reflection type polarizing plate in this order from the diffuser 18a side. The optical sheet 18b is configured to alter the light emitted from the LED light source 28 and passed through the diffuser 18a into a planar light. The liquid crystal panel 16 is arranged on a front side of the optical sheet 18b. The optical sheet 18b is sandwiched between the diffuser 18a and the liquid crystal panel 16.

As described above, in the backlight unit 24 according to this embodiment, the light emitted from each LED light source 28 is divided into three groups, i.e., light directly traveled toward the opening of the chassis 22 (the liquid crystal panel 16 side), light traveled toward the first side wall 26a, and light traveled toward the second side wall 26b. The light traveled to the first side wall 26a is reflected by the side surface 26a1 thereof and directed toward the liquid crystal panel 16. The light traveled to the second side wall 26b is reflected by the side surface 26b1 thereof. The second side wall 26b has the outline in a rhombic shape in a plan view, and thus the light emitted from the LED light source 28 and reflected by the side surface 26a1 of the second side wall 26b is directed toward the first side wall 26a. Accordingly, the light can be effectively directed to a section of the display surface of the liquid crystal panel 16 that overlaps with an area between the adjacent LED light sources 28. This prevents or reduces the brightness unevenness of the display surface of the liquid crystal panel 16.

In the backlight unit 24 according to this embodiment, the side surface 26a1 of the first side wall 26a extends straightly in a cross section taken along the Y-axis direction. The side surface 26a1 of the first side wall 26a and the front surface 30a of the LED board 30 form the angle θ1 that satisfies the expression: 10°≤θ1≤80°. If the angle θ1 is smaller than 10° or larger than 80°, the light traveled toward the first side wall 26a is less reflected toward the liquid crystal panel 16. According to the backlight unit 24 of this embodiment, the angle θ1 is set to satisfy the above expression, and thus the amount of light to be reflected toward the liquid crystal panel 16 of the chassis 22 can be increased. This further prevents or reduces the brightness unevenness of the display surface of the liquid crystal panel 16.

In the backlight unit 24 according to this embodiment, the side surface of the first side wall 26a is arranged to satisfy the expression: θ1=45°+tan$^{-1}$(H1/L1)/2 where L1 is the distance between the LED light source 28 and the apex of the first side wall 26a and H1 is the distance between the front surface 30a of the LED board 30 and the apex of the first side wall 26a. With this configuration, the light traveled to the first side wall 26a can be effectively reflected toward the opening of the chassis 22. This prevents or reduces the brightness unevenness of the display surface of the liquid crystal panel 16.

In the backlight unit 24 according to this embodiment, the angle θ2 formed between the side surface 26b1 of the second side wall 26b and the front surface 30a of the LED board 30 satisfies the expression: 45°≤θ2≤90°. If the angle θ2 is smaller than 45° or larger than 90°, the light traveled toward the second side wall 26b cannot be directed to the first side wall 26a. In the backlight unit 24 according this embodiment, the light traveled to the second side wall 26b can be effectively directed toward the first side wall 26a. This prevents or reduces the brightness unevenness of the display surface of the liquid crystal panel 16.

In the backlight unit 24 according to this embodiment, the second side walls 26b are arranged so as to extend from one of the first side walls 26a to another one of the first side walls 26a adjacent to each other in the Y-axis direction. With this configuration, most of the light emitted from the LED light source 28 and traveled to the second side wall 26b can be directed to the first side wall 26a. Accordingly, the light can be more effectively directed to the section of the display surface of the liquid crystal panel 16 that overlaps with the area between the adjacent LED light sources 28.

In the backlight unit 24 according to this embodiment, the second side wall 26b has the top surface 26b2 that is arranged parallel with the bottom plate 22a of the chassis 22. With this configuration, the light traveled away from the opening side of the chassis 22 to the second side wall 26b can be reflected by the top surface 26b2 toward the opening of the chassis 22.

In the backlight unit 24 according to this embodiment, the reflector 26 includes the bottom 26f that is arranged on the front surface 30a of the LED board 30 except for the areas in which the first side walls 26a and the second side walls 26b are arranged. Further, the bottom 26f includes the through holes 26d through which the respective LED light sources 28 are passed. With this configuration, the light traveled away to the front surface 30 side of the LED board 30 can be reflected toward one of the opening of the chassis 22, the first side wall 26a, and the second side wall 26b. This further increases the brightness of the display surface of the liquid crystal panel 16.

As illustrated in FIG. 3, in the backlight unit 24 according to this embodiment, the distance between the LED light sources 28 adjacent to each other in the Y-axis direction and the distance between the LED light sources 28 adjacent to each other in the X-axis direction are different in a plan view. The first side walls 26a are each arranged between the LED light sources 28 adjacent to each other at larger intervals (in the Y-axis direction) and the second side walls 26b are each arranged between the LED light sources 28 adjacent to each other at smaller intervals (in the X-axis direction). With this configuration, the first side walls 26a and the second side walls 26b can more effectively direct the light to the sections of the display surface of the liquid crystal panel 16 that overlap with the areas between the LED light sources 28 adjacent to each other.

In the backlight unit 24 according to this embodiment, the optical member 18 configured to pass the light from the LED light source 28 therethrough is arranged at the opening of the chassis 22, such that the space S is provided between the apex of the first side wall 26a and the optical member 18. With this configuration, the light directed toward the opening of the chassis 22 can be effectively scattered. This increases the brightness of the display surface of the liquid crystal panel 16.

In the backlight unit 24 according to this embodiment, the first side walls 26a and the second side walls 26b are equal in height. With this configuration, most of the light traveled to the second side wall 26b can be directed to the first side wall 26a that is adjacent to the second side wall 26b. Accordingly, the light can be more effectively directed to the section of the display surface of the liquid crystal panel 16 that overlaps with the area between the adjacent LED light sources 28.

In the backlight unit 24 according to this embodiment, the LED light sources 28 each have a light intensity distribution in which the light having a peak light intensity travels in a direction inclined with respect to the front direction of the LED light source 28. With this configuration, the light can be emitted from the LED light source 28 at a wide angle, and thus the amount of light that is emitted from the LED light source 28 and applied to the side surface of the first side wall 26a can be increased. This increases the brightness of the display surface of the liquid crystal panel 16.

In the backlight unit 24 according to this embodiment, the angle between the side surface 26a1 of the first side wall 26a and the front direction of the LED light source 28 is smaller than the angle between the light having a peak light intensity and the front direction. In this configuration, the light emitted from the LED light source 28 with the peak light intensity is applied to the side surface of the first side wall 26a. Accordingly, the amount of light emitted from the LED light source 28 and directed to the front direction of the LED light source 28 can be increased. This further increases the brightness of the display surface of the liquid crystal panel 16.

In the backlight unit 24 according to this embodiment, the first side walls 26a and the second side walls 26b define equal spaces in each of which the respective LED light sources 28 is arranged. This facilitates the production of the reflector 26.

Second Embodiment

Figure 7:
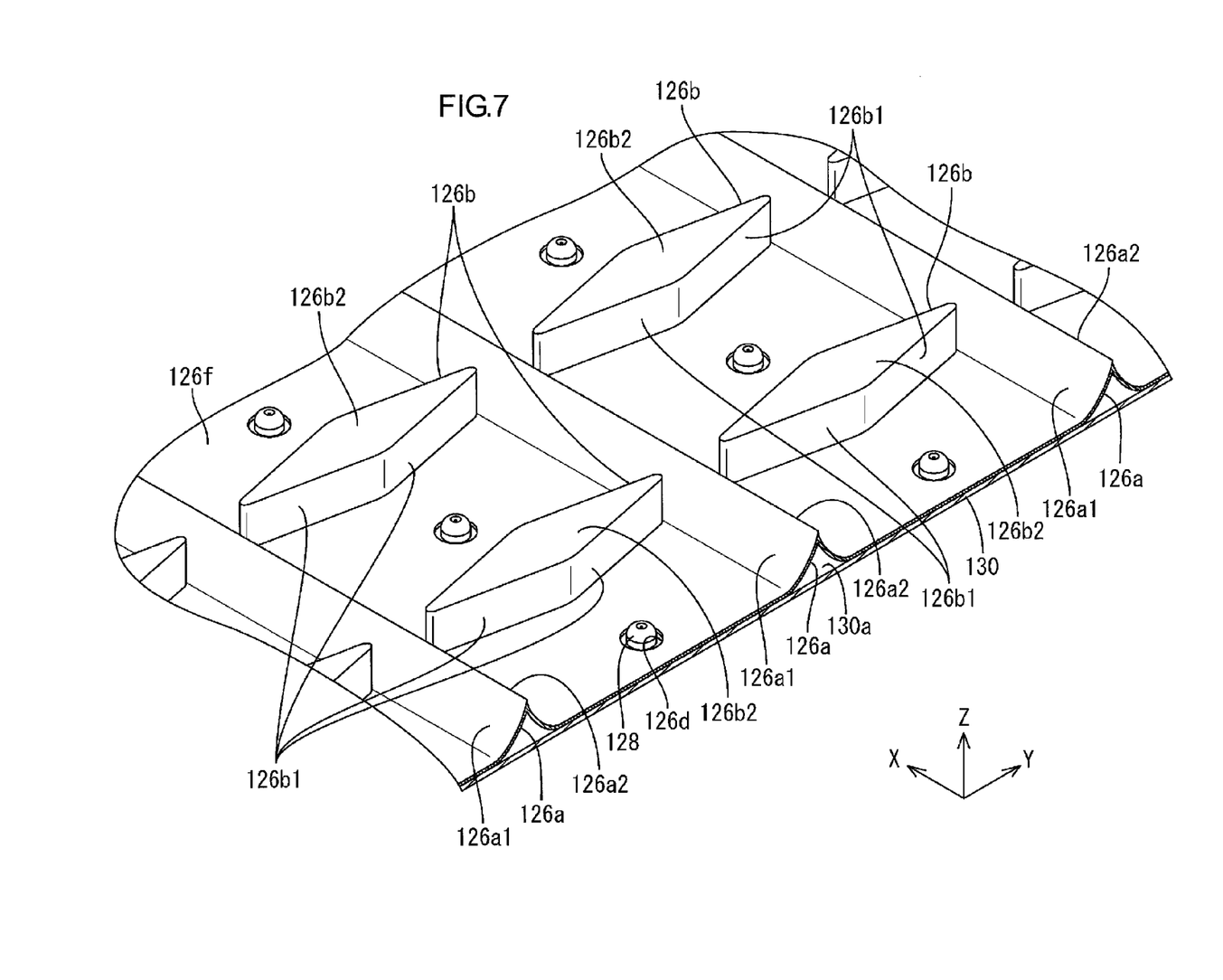
FIG. 7 is a magnified perspective view of LED light sources 128 and a reflector 126 included in a backlight unit according to a second embodiment.

A second embodiment will be described with reference to a drawing. FIG. 7 is a magnified perspective view of LED light sources 128 and a part of a reflector 126 included in a backlight unit according to the second embodiment. In the second embodiment, a shape of a side surface 126a1 of a first side wall 126a and a shape of a part of a second side wall 126b are different from those in the first embodiment. The other structures are same as those of the first embodiment, and thus configurations, functions, and effects similar to those of the first embodiment will not be explained. In FIG. 7, parts designated with the number obtained by adding 100 to the symbols in FIG. 6 are the same as the parts described in the first embodiment.

As illustrated in FIG. 7, in the backlight unit according to the second embodiment, the side surface 126a1 of the first side wall 126a is rounded to have a concave shape in a cross section taken along the Y-axis direction. The side surface 126a1 is rounded to an inner side of the first side wall 126a. In other words, two side surfaces 126a1 of the first side wall 126a are each curved to the inner side of the first side wall 126a. The side surface 126a1 of the first side wall 126a having such a configuration can focus light on the section of the display surface of the liquid crystal panel that overlaps with the area between the LED light sources 28 adjacent to each other. This prevents or reduces the uneven brightness of the display area of the liquid crystal panel included in the backlight unit according to the second embodiment.

As illustrated in FIG. 7, in the backlight unit according to the second embodiment, each of the second side walls 126b having a rhombic shape in a plan view has four corners that are rounded. In other words, the second side wall 126b having a rhombic shape has four corners that are not pointed, but are rounded. In the production of the second side wall 126b, the corners of the second side wall 126b tend to be rounded. In the backlight unit according to the second embodiment, the production of the second wall 126b is facilitated.

Third Embodiment

Figure 8:
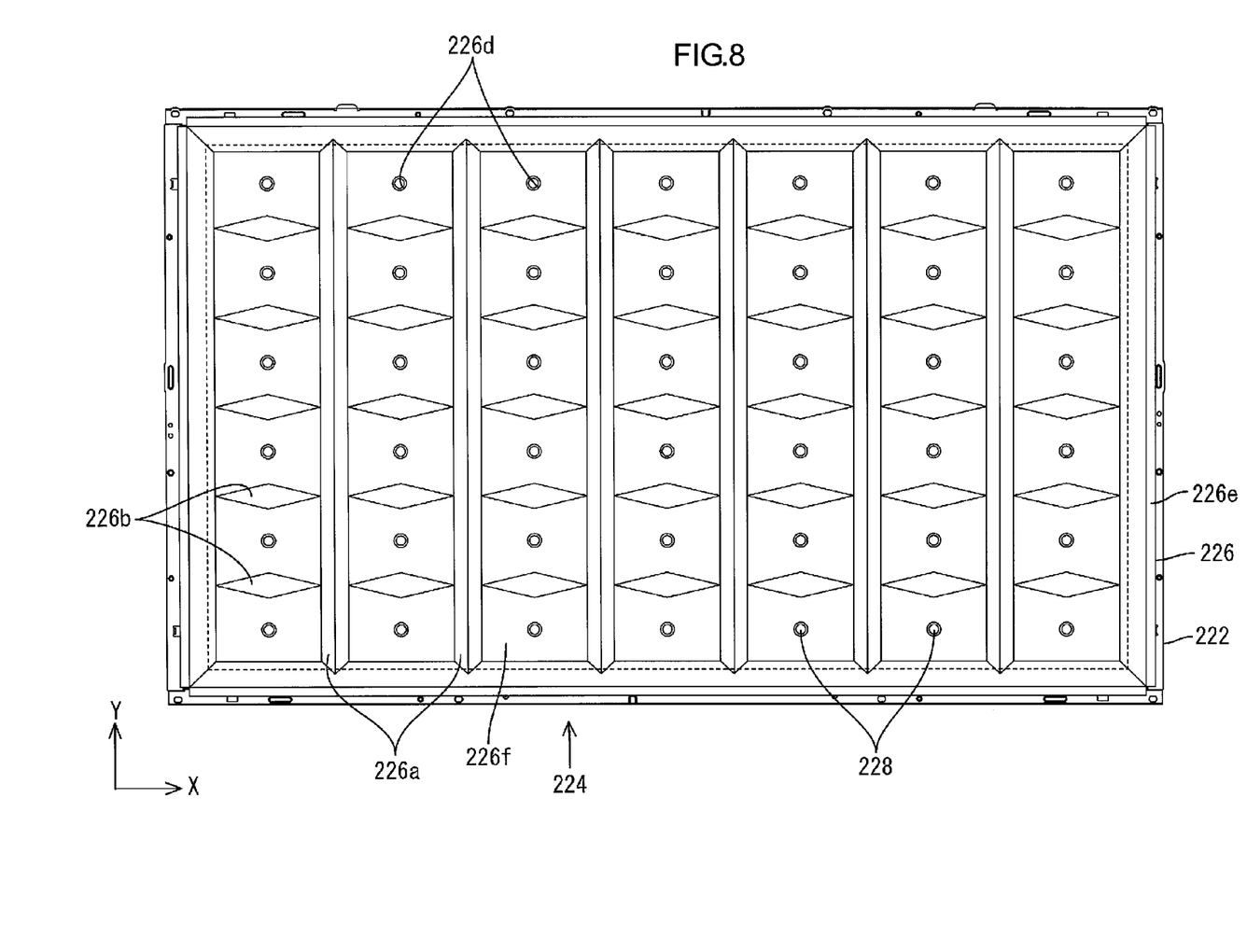
FIG. 8 is a plan view of a backlight unit 224 according to a third embodiment.

A third embodiment will be described with reference to a drawing. FIG. 8 is a plan view of the backlight unit 224 according to the third embodiment. In the third embodiment, first side walls 226a and second side walls 226b are arranged differently from the arrangement in the first embodiment. The other structures are same as those of the first embodiment, and thus configurations, functions, and effects similar to those of the first embodiment will not be explained. In FIG. 8, parts designated with the number obtained by adding 200 to the symbols in FIG. 3 are the same as the parts described in the first embodiment.

In the backlight unit 224 according to the third embodiment, the arrangement of the first side walls 226a and the second side walls 226b in the X-axis direction and the Y-axis direction are opposite from that in the first embodiment. That is, the second side walls 226b are each arranged between the LED light sources 228 that are adjacent to each other in the Y-axis direction. The first side walls 226a are each arranged between the LED light sources 228 that are adjacent to each other in the X-axis direction. In the backlight unit 224 including the first side walls 226a and the second side walls 226b that are arranged as above, the light traveled to the first side wall 226a can also be directed toward the opening of the chassis 222 as in the first embodiment. In addition, the light traveled to the second side wall 226b is reflected by the side surface thereof to the first side wall 226a, and then the light is directed to the opening of the chassis 222 by the side surface of the second side wall 226b. With this configuration, the light can be effectively directed to the section of the display surface that overlaps with the area between the LED light sources 228 adjacent to each other. This prevents or reduces the uneven brightness of the display surface of the liquid crystal panel.

Fourth Embodiment

Figure 9:
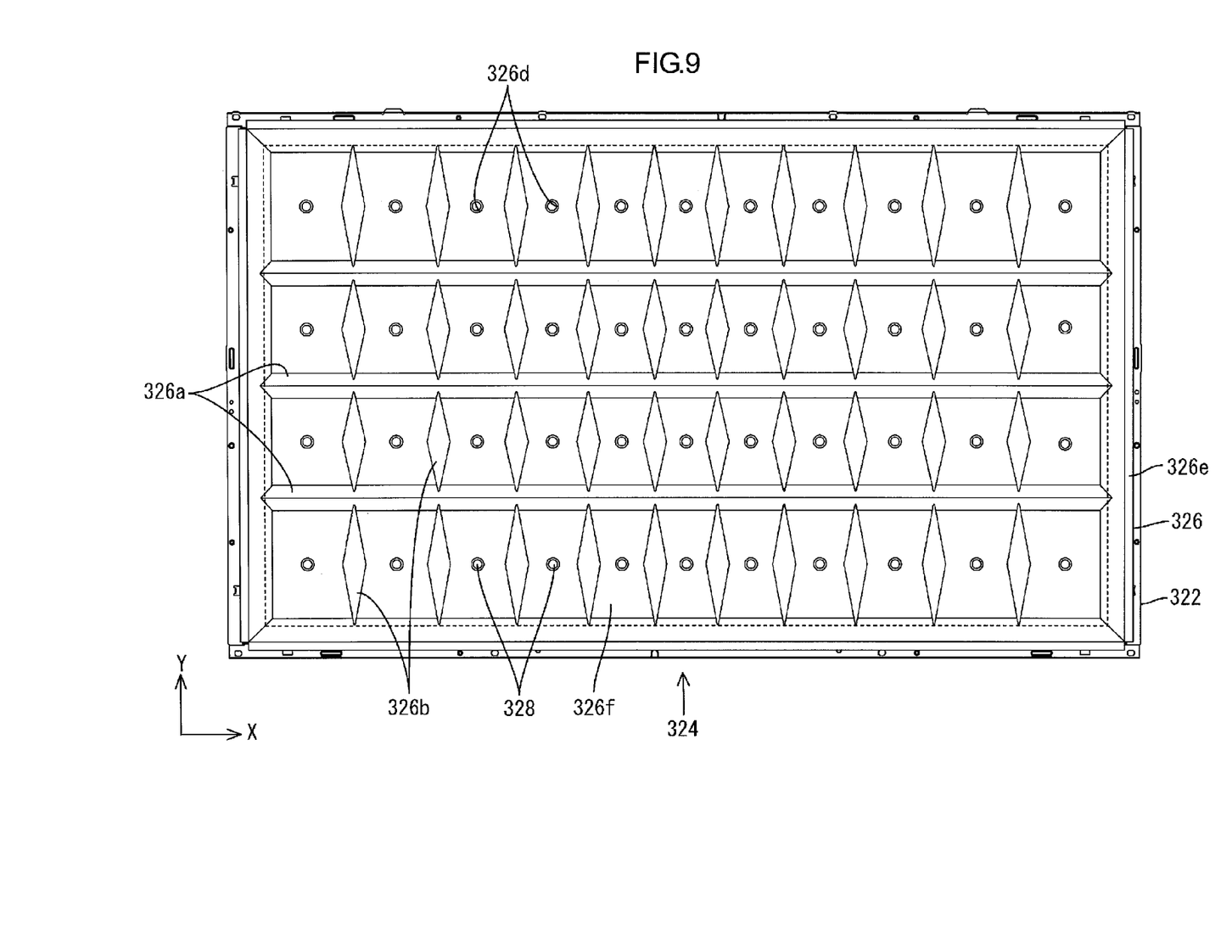
FIG. 9 is a plan view of a backlight unit 324 according to a fourth embodiment.

A fourth embodiment will be described with reference to a drawing. FIG. 9 is a magnified perspective view of LED light sources 428 and a part of a reflector 426 included in a backlight unit according to the fourth embodiment. In the fourth embodiment, the distance between the first side walls adjacent to each other, the distance between the second side walls adjacent to each other, and a configuration at a border between the first side wall and the second side wall are different from those in the first embodiment. The other structures are same as those of the first embodiment, and thus configurations, functions, and effects similar to those of the first embodiment will not be explained. In FIG. 9, parts designated with the number obtained by adding 400 to the symbols in FIG. 3 are the same as the parts described in the first embodiment.

In the backlight unit 324 according to the fourth embodiment, two corners of the second side wall 326b that are located adjacent to the first side wall 326a are connected to the first side wall 326a. In the production of the second side wall 326b, the two corners located adjacent to the first side wall 326a tend to be continuous with the first side wall 326a. Thus, the second side wall 326b of the backlight unit 324 according to the present embodiment can be easily produced.

In the backlight unit 324 according to the fourth embodiment, each of the distance between the first side walls 326a adjacent to each other and the distance between the second side walls 326b adjacent to each other decreases toward a middle section of the chassis 322. In addition, distances between the LED light sources 328 adjacent to each other in the X-axis direction and the Y-axis direction decrease toward the middle section of the chassis 322. With this configuration, in the backlight unit 324 according to this embodiment, the amount of light reflected by the first side wall 326a and the second side wall 326b at the middle section of the chassis 322 can be increased. This increases the brightness of the display surface of the liquid crystal panel at the middle section.

The configuration of the embodiments corresponds to the configuration of the present invention as follows: the surface 22z of the bottom plate 22a is one example of a "first main surface" of the chassis, the LED light source 28, 128, 228 is one example of a "light source"; the surface 30a of the LED board 30 is one example of a "a mounting surface on which the light sources are mounted"; and the backlight unit 24, 224 is one example of a "lighting device; and the space S is one example of a "space".

The above embodiments may include the following modifications.

(1) In the above embodiments, the second side wall extends perpendicular to the front surface of the LED board. However, the side surfaces of the second side wall may extend at an acute angle with respect to the front surface of the LED board.

(2) In the above described embodiments, the LED light sources adjacent to each other are spaced apart from each other at regular intervals in the vertical direction and the horizontal direction in a plan view. However, the adjacent LED light sources may not be spaced apart from each other at regular intervals.

(3) In the above embodiments, the LED light sources arranged in a matrix are arranged in rows and columns that correspond to the X-axis direction (the long-side direction of the chassis) and the Y-axis direction (the short-side direction of the chassis), respectively. However, the rows and the columns of the LED light sources may not correspond to the X-axis direction and the Y-axis direction.

(4) The shape of each of the first side wall and the second side wall is not limited to the above embodiments and may be suitably changed.

(5) The above embodiments employ the liquid crystal display device including the liquid crystal panel as a display panel. The technology of the present invention can be applied to display devices including other types of display panels.

(6) In the above embodiments, the television device including the tuner is used. However, the technology can be applied to a display device without a tuner.

The embodiments of the present invention are described in detail above for illustrative propose only, and it is to be understood that the claims are not limited by the forgoing description. The technology described in the claims includes the various modifications of the embodiments described above.

The technology components described in the description and the drawings are not required to be used in the combination described in the claims as originally filed. The technology components can show its technical utility when used either alone or in combination. In addition, the technology described in the above description and the drawings can achieve more than one object at the same time, and the technical utility of the technology can be recognized when the technology achieves one of the objects.

EXPLANATION OF SYMBOLS

TV: television device, Ca, Cb: cabinet, T: tuner, S: stand, 10: liquid crystal display device, 12: bezel, 14: frame, 16: liquid crystal panel, 18: optical member, 22, 222, 322: chassis, 24, 224, 324: backlight unit, 26, 126, 226, 326: reflector, 26a, 126a, 226a, 326a: first side wall, 26b, 126b, 226b, 326b: second side wall, 28, 128, 228, 328: LED light source, 30: LED board

The invention claimed is:
1. A lighting device comprising:
a chassis including:
a rectangular bottom plate having an inner surface; and
side plates projecting at an angle from corresponding edges of the inner surface such that the chassis has an opening on a side opposite to the bottom plate;
a plurality of light sources arranged in a matrix on the inner surface of the bottom plate of the chassis, wherein the light sources are configured to emit light toward the opening of the chassis; and
a reflector including:
a bottom portion arranged on the inner surface of the bottom plate of the chassis, the bottom portion including a plurality of through holes through which the light sources extend, respectively;
at least one first projecting portion projecting from the bottom portion between the light sources that are adjacent to each other, wherein
the at least one first projecting portion has an elongated ridge-shaped configuration including a first surface and a second surface,
the first surface projects from the bottom portion at an angle to reflect the light toward the opening of the chassis,
the second surface projects from the bottom portion at an angle toward the first surface such that a distal end of the first surface and a distal end of the second surface are connected together to reflect the light toward the opening of the chassis, and the at least one first projecting portion is arranged parallel to one of long and short edges of the bottom plate of the chassis; and second projecting portions each projecting from the bottom portion between the adjacent light sources, wherein each of the second projecting portions includes a rhombic top surface and side surfaces that extend between the top surface and the bottom portion, and the second projecting portions are arranged in a matrix such that the second projecting portions and the light sources are arranged alternately along a longitudinal direction of the at least one first projecting portion.

2. The lighting device according to claim 1, wherein the angle of the first surface of the at least one first projecting portion relative to the bottom portion is in a range expressed by $$10° \leq \theta1 \leq 80°$$

where $\theta1$ is the angle of the first surface of the at least one first projecting portion relative to the bottom portion.

3. The lighting device according to claim 2, wherein each of the light sources has a dome-shaped configuration, the angle of the at least one first projecting portion is defined to satisfy an expression:

$$\theta1 = 45° + \tan^{-1}(H1/L1)/2$$

where L1 is a distance between a center of the dome-shaped configuration and an apex of the at least one first projecting portion, and H1 is a distance between a surface of the bottom portion and the apex of the at least one first projecting portion.

4. The lighting device according to claim 1, wherein the first surface and the second surface of the at least one first projecting portion are concave.

5. The lighting device according to claim 1, wherein each of the side surfaces of each of the second projecting portions projects from the bottom portion at an angle that satisfies an expression:

$$45° \leq \theta2 \leq 90°$$

where $\theta2$ is the angle of the respective side surface of the respective second projecting portion relative to the bottom portion.

6. The lighting device according to claim 1, wherein each of the second projecting portions includes four corners that are rounded.

7. The lighting device according to claim 1, wherein at least one first projecting portion includes a plurality of first projecting portions, and each of the second projecting portions is arranged between the plurality of first projecting portions that are adjacent to each other.

8. The lighting device according to claim 7, wherein each of the second projecting portions includes two corners opposite to the respective first projecting portions and connected to the respective first projecting portions.

9. The lighting device according to claim 1, wherein the rhombic surface of each of the second projecting portions is parallel to the bottom plate of the chassis.

10. The lighting device according to claim 1, wherein the light sources are arranged at first intervals along a direction perpendicular to a longitudinal direction of the at least one first projecting portion and at second intervals along the longitudinal direction of the at least one first projecting portion, the first intervals are larger than the second intervals, the at least one first projecting portion is arranged between first rows of the light sources arranged at the first intervals, and the second projecting portions are arranged between second rows of the light sources arranged at the second intervals.

11. The lighting device according to claim 10, wherein the first intervals gradually decrease toward a middle section of the bottom plate of the chassis, at least one first projecting portion includes a plurality of first projecting portions, and the plurality of first projecting portions are arranged at intervals that gradually decrease toward the middle section of the bottom plate of the chassis.

12. The lighting device according to claim 10, wherein the second intervals gradually decrease toward a middle section of the bottom plate of the chassis, and the second projecting portions are arranged at intervals that decrease toward the middle section of the bottom plate of the chassis.

13. The lighting device according to claim 1, further comprising an optical member spaced closer to the opening of the chassis than the reflector and configured to pass the light from the light sources, wherein the optical member is spaced away from an apex of the at least one first projecting portion.

14. The lighting device according to claim 13, wherein the at least one first projecting portion and the second projecting portions are equal in height.

15. The lighting device according to claim 1, wherein each of the light sources has a light intensity distribution in which rays of the light having a peak light intensity travels in directions angled with respect to a direction from each of the light sources straight toward the opening of the chassis.

16. The lighting device according to claim 15, wherein each of the first surface and the second surface of the at least one first projecting portion is configured such that an angle formed between each of the first surface and the second surface of the at least one first projecting portion and the direction from each of the light sources straight toward the opening of the chassis is smaller than an angle formed between at least one of the rays of light having the peak light intensity and the direction from each of the light sources straight toward the opening of the chassis.

17. The lighting device according to claim 1, wherein the at least one first projecting portion and the second projecting portions define spaces equal in size, wherein each of the light sources is arranged in each of the spaces.

18. A display device comprising:

a display panel configured to provide display using light from the lighting device according to claim 1.

19. A television device comprising the display device according to claim 18.

* * * * *